United States Patent [19]

Beraud et al.

[11] Patent Number: 4,464,783
[45] Date of Patent: Aug. 7, 1984

[54] SPEECH CODING METHOD AND DEVICE FOR IMPLEMENTING THE IMPROVED METHOD

[75] Inventors: Jean-Paul Beraud, Saint-Laurent-du-Var, France; Daniel J. Esteban, Raleigh, N.C.; Claude Galand, Cagnes, France

[73] Assignee: International Business Machines Corporation, Armonk, N.Y.

[21] Appl. No.: 369,997

[22] Filed: Apr. 20, 1982

[30] Foreign Application Priority Data

Apr. 30, 1981 [EP] European Pat. Off. ........ 81430011.7

[51] Int. Cl.³ .......................... G10L 1/00; H04B 1/66
[52] U.S. Cl. .................................... 381/31; 375/122; 340/347 DD
[58] Field of Search .................................... 381/29–35; 364/513.5; 375/122; 360/8

[56] References Cited

U.S. PATENT DOCUMENTS

| | | | |
|---|---|---|---|
| 4,184,049 | 1/1980 | Crochiere et al. | 381/31 |
| 4,191,858 | 3/1980 | Araseki | 381/31 |
| 4,216,354 | 8/1980 | Esteban et al. | 381/31 |

Primary Examiner—E. S. Matt Kemeny
Attorney, Agent, or Firm—John B. Frisone

[57] ABSTRACT

This improved speech signal Block Coded PCM (BCPCM) system reduces the number of bits allocated to transmitting the scale factor, thereby releasing bits for allocation to coding samples in the associated block of samples. The scale factor (c) is calculated for every 16 millisecond block of samples. However, the scale factor will be transmitted only once per 32 millisecond block if there is no significant difference between the two sequential values. The original speech signal is split into 16 frequency subbands, each subband initials sampled and 12-bit coded, then requantized in BCPCM at dynamically variable bit rates depending on the scale factor transmission rate.

8 Claims, 6 Drawing Figures

SPEECH CODING METHOD AND DEVICE FOR IMPLEMENTING THE IMPROVED METHOD

DESCRIPTION

1. Technical Field

The present invention relates to digital coding techniques for a speech signal mainly intended for transmission.

2. Background Art

Digital conversion (coding) of a signal varying with time is performed by sampling and quantizing the samples. This involves prior division of the signal amplitude measuring scale into segments and assigning a unique digital value to each one of said segments. During the quantizing operation, that is the conversion of the signal samples into digital values, all signals samples the amplitude of which falls within the limits of one segment are coded with the same digital value. Naturally, this results in an inaccurate transcription leading to an error between the original signal and its coded expression. The operations performed are said to generate a quantizing noise. It is obvious that by reducing the segments widths said noise can be reduced. However, this means that for the limits of a given amplitude variation of the measuring scale the number of segments increases and hence the number of digital values required to code said segments, and consequently the number of bits required to digitally define the number of bits also increases. This makes the devices used to subsequently process the digitally expressed signal more complex and, if the signal is to be transmitted from an emitter to a receiver station, results in a congestion of the signal transmission channels. It has therefore been necessary to try to reduce the bit rate required for coding while ensuring an appropriate signal/noise ratio. Or inversely, once the total bit rate assigned to the quantization has been defined, attempts have been made to optimize the use of the available bits so as to minimize the noise.

These findings are at the origin of the so-called differential or delta PCM encoding where the quantizing bits are used to code the signal changes only between two consecutive sampling times and not for the whole amplitude of each sample. This results in a lower voltage swing to be quantized and therefore in a better use of the quantizing bits owing to the division of the measuring scale into thinner segments than those obtained if the same number of bits had been used to directly code the entire amplitude of the samples of the originally supplied signal.

These methods have then been further improved by taking into consideration the statistical characteristics of the signal to be coded. For example, realizing that for speech-originating signals the frequency range containing these is relatively limited and that the energy of these signals is in general concentrated in the low voice frequency range regions, it has been proposed to split the original speech frequency range into several bands and to allocate more bits for quantizing the low frequency bands, hence to code the signals in these bands more accurately than those in the higher bands. An example of an embodiment of this type is described by Crochiere et al in an article published in the Bell System Technical Journal of October 1976. The speech signal there is first filtered by a set of adjacent band pass filters covering the whole telephone range. The resulting signals frequency spectra are then shifted into the base band frequency range by modulation, and sampled at their Nyquist frequency. Then each signal (or sub-band) is separately quantized in a non-uniform manner, that is by allocating more bits to the lower bands than to the higher bands. A statistical study permits choosing several quantizing bit rates and defining an appropriate distribution of said bits over the subbands. This type of coding is, however, based on statistical data and not on actual conditions and therefore does not ensure optimum coding.

In other systems, the signal coding quality has been improved by basing the bit allocation no longer on statistical results but on real data directly obtained from the characteristics of the signal to be coded.

In this case, in order to prevent the coder from becoming too complex and the coding/decoding system from becoming impractical, it was necessary to use techniques such as those described in the U.S. Pat. No. 4,142,071 granted to the applicant of this application, "Quantizing Process with Dynamic Allocation of the Available bit Resources, and Device for Implementing Said Process". This process is essentially applied to the well-known BCPCM coding technique, where the signal is coded by segments of predetermined duration (K samples by segment). The signal is furthermore split into p sub-bands in the frequency range and each sub-band is separately coded according to its own characteristics. More precisely, the number of bits $n^i$ to be allocated for quantizing the signal of the ith sub-band is derived for K samples of a given block or segment from the characteristics of said K samples. In other words, the process described in the U.S. Pat. No. 4,142,071 allows optimizing to a certain extent the distribution of the coding system resources and economically using these resources based on the characteristics of the signal to be coded.

For more information on the BCPCM-type coding, reference can be made to the article by A. Croisier, relating to a presentation made in the International Seminar of Digital Communications 1974 in Zurich and entitled "Progress in PCM and Delta Modulation: Block Companded Coding of Speech Signal". The method described in the article by A. Croisier can be summarized as follows: the signal to be coded is first sampled and then the sample flow obtained is divided into consecutive successive segments of a given duration, or into blocks of K samples, each of said blocks being then quantized. For this, each of the blocks is assigned a scale factor "C" so that the biggest sample of the block cannot fall outside the coding limits. Then the scale factor and the K samples of the block are quantized. The scale factor C (or block characteristic) together with the K samples supplies, after quantizing, the digital data which completely define the sample block.

The U.S. Pat. No. 4,142,071 herein incorporated by reference describes how the speech coding quality can be improved and the quantizing noise of the speech-originating signal reduced by dynamically and efficiently distributing the bits available for said quantization. For this, the whole speech signal is distributed over several subbands in the frequency range, and the content of each subband is BCPCM coded. This method allows better use of the quantizing bits. But whether the signal be distributed over several subbands or not, BCPCM coding does not permit all available coding bits to be assigned to quantizing the signal samples. In effect, the scale factors associated with the sample blocks must also be quantized. Furthermore, the scale factor is so important for signal decoding that it is necessary to protect it by associating it with one (or several) parity bits. This further reduces the bits available for quantizing the samples. It is of course possible to reduce the incidence of the scale factor presence on the number of bits remaining available for quantizing the samples of the signal properly speaking by prolonging the duration of each segment or, in other words, by processing blocks including a larger number of samples. For example, instead of processing blocks representing a 16 ms signal, 32 ms blocks could be chosen which would reduce the number of scale factors to be quantized by a factor of two. However, this solution has secondary effects which, during decoding, produce parasitic noise resembling low-level echoes.

SUMMARY OF THE INVENTION

An object of the present invention is to improve the so-called BCPCM coding method.

Another object of the invention is to provide a BCPCM coding method for a signal (especially of speech origin) the spectrum of which covers a predetermined and relatively limited frequency band, said method allowing the increase of the number of bits available for quantizing the samples of the signal properly speaking while minimizing as far as possible the negative secondary effects which might result therefrom.

A further object of the invention is to design a device for implementing the above method.

More precisely, said invention relates to a speech signal BCPCM coding method which includes an analysis of the characteristics of the signal to be coded. This analysis qualifies each sample block to be processed as a transient block or non-transient block, deduced from said qualification is the number of scale factors to be associated with said block to derive therefrom the number of bits required for the quantization of said scale factor(s) before quantizing the samples of the signal by means of the quantizing bits remaining available for the considered block.

The foregoing and other objects, features and advantages of the invention will be apparent from the following, more particular description of a preferred embodiment of the invention, as illustrated in the accompanying drawings.

DETAILED DESCRIPTION OF A PREFERRED EMBODIMENT OF THE INVENTION

Figure 1:
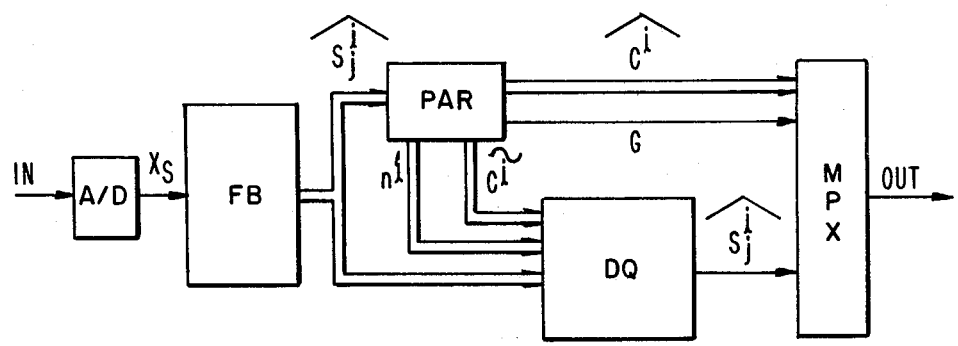
FIGS. 1 and 4 are block diagrams of transmission devices for implementing the method according to the invention.

FIG. 1 illustrates a device for subband coding of the speech-originating signal for use in a multiplex transmission system. A system somewhat similar to that of FIG. 1 has already been described in an article published by D. Esteban and C. Galand based on a presentation at the 1978 IEEE ICASSP held at Tulsa, Oklahoma Apr. 10–12, 1978, and entitled: "32 KBps CCITT Compatible Split Band Coding Scheme". The speech-originating signal which covers a low frequency band of up to about 4 KHz is applied to input IN. It is A/D converted at its Nyquist frequency, that is, at 8 KHz, and coded in conventional PCM at 12 bits by means of the same A/D device. The digital samples $X_s$ are transmitted to a bank of filters FB. This bank distributes the signal over p contiguous frequency subbands containing samples $S_j^i$ (where i = 1, 2, 3, ..., p designates the rank of the subband to which the samples belong, and where j = 1, 2, ..., K' designates a parameter defined hereafter). Samples $S_j^i$, initially quantized at 12 bits, are then requantized at lower bit rates. However, these new bit rates are dynamically adjusted to the characteristics (energy) of the signal contained in the subband considered during a time interval of predetermined duration (block coding). For this, the digital information associated with the subbands and originating from filter bank FB are transmitted to a parameter generator PAR and to a requantizing device DQ. Parameter generator PAR supplies to device DQ parameters $n^i$ and $C^i$. Parameter $n^i$ defines the bit rate to be allocated to requantizing the $i^{th}$ subband for said predetermined duration. Said bit rate is governed by the relation:

$$n^i = 1/p \left[ N - \sum_{j=1}^{p} \log C^j \right] + \log C^i \quad (1)$$

where N is the total number of bits provided for requantizing the samples of the set of p subbands, and where coefficients $C^i$ designate the so-called scale factors defined hereafter.

Values $n^i$ and $C^i$ are used to adjust in DQ the requantizing step size of the $i^{th}$ subband so that:

$$Q^i = \frac{C^i}{2^{n^i - 1}} \quad (2)$$

(In practice, as explained hereafter, the term $\bar{C}^i$ derived from $C^i$ is used instead of $C^i$).

Thus, requantizing device DQ provides the requantized samples $\hat{S}_j^i$.

The scale factor of the $i^{th}$ subband is defined by means of the relation (3) given hereafter according to the BCPCM-type methods:

$$C^i = \max_{j=1,K'} (|S_j^i|) \quad (3)$$

where K' designates the number of samples contained in the $i^{th}$ subband during said time interval of predetermined duration and j designates the rank of the sample in a sample block obtained in said $i^{th}$ subband during the same time interval.

It has been decided to divide the frequency band of 0 to 4 KHz into 16 adjacent subbands (p = 16). (As can be seen hereafter, the three highest sub-bands can be ignored since 13 subbands are sufficient to cover the telephone frequency range of 0 to 3200 Hz). Furthermore, said predetermined duration has been fixed at 32 ms. If the input signal IN is sampled at the Nyquist frequency, that is at 8 KHz, each 32 ms sample block contains 256 samples. After coding by the A/D device at 12 bits, these samples pass into filter FB and are distributed over the 16 subbands. Such a filter has been described in the above-mentioned U.S. patent. In addition to the filtering function per se, this filter provides a so-called decimation operation. As a result, for each time interval of predetermined duration considered, the number of samples available on each of the 16 subbands after passing filter FB is:

$$K' = \frac{256}{16} = 16$$

The quantized (or requantized) scale factors $\hat{C}^i$ and the requantized samples $S_j{}^i$ are multiplexed on a digital transmission line by means of the multiplexor MPX. In this case, block synchronization characters must be added so that, at the other end of the transmission line, the receiver can identify the received block samples and restore the speech signal. When transmitting at 16 Kbps, 512 bits are available for 32 ms. The more bits are assigned to the data other than the signal samples properly speaking (synchronization characters and scale factors mainly), the less bits remain for said samples. One therefore tries to reduce the number of bits for coding the scale factors while ensuring high-quality coding. To avoid secondary effects such as echoes probably due to the fact that the 32 ms blocks are too long, as indicated above, the length of each block is first adapted to the characteristics of the scale factor concerned. In other words, the value of $C^i$ is changed more or less often depending on whether its variation is slow (non-transient block) or fast (transient block). In the present case, it has been decided to transmit a maximum of two values $C_i$ by subband, which limits the block considered to two 16 ms blocks if the initial 32 ms block is of the transient type, and to transmit only one $C^i$ by sub-band, in 32 ms, if the sample block is non-transient. For each sample block, two values $C^i$ are determined:

$$^1C^i = \max_{j=1 \text{ to } 8} (|S_j{}^i|) \quad (4)$$

and $$^2C^i = \max_{j=9 \text{ to } 16} (|S_j{}^i|) \quad (5)$$

In other words (see FIG. 2), the samples of each subband are submitted to a sort operation to select the samples having the largest amplitude during the first 16 ms and during the last 16 ms of the duration of the sample block considered.

Figure 6:
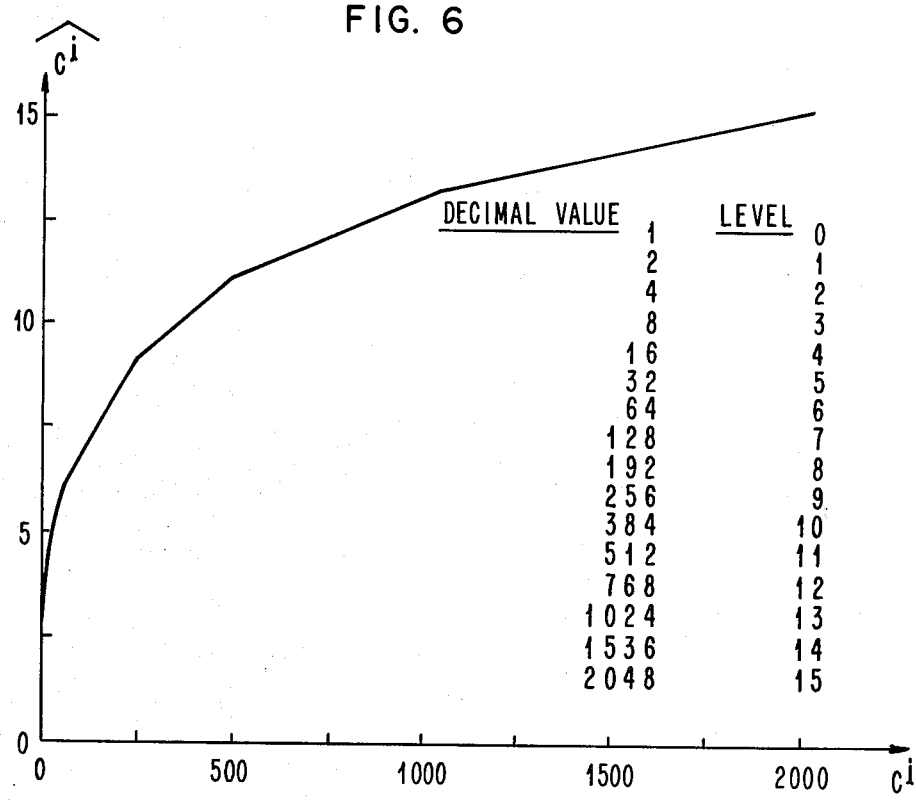
FIG. 6 is a logarithmic plot which may be used for transcoding twelve bit encoded scale factors into four bit words.

The values $^1C^i$ and $^2C^i$ are then recoded with four instead of 12 bits by means of a logarithmic scale (represented in FIG. 6) supplying the 4-bit coded expression $^1\hat{C}^i$ and $^2\hat{C}^i$. The transcoding operation of the 12-bit $C^i$ into a 4-bit $\hat{C}^i$ can be performed by means of a so-called T.L.U. table representing a storage which, when addressed by 12-bit words, supplies an output of 4-bit words. (In practice, the transcoding operation can be performed more economically by means of a conventional successive test method). For example, if $C^i=60$, it is coded 000000111100 at 12 bits. For a 4-bit transcoding operation, it is assimilated to $C^i=64$, that is, the seventh level of decimal-coded binary values at 12 bits and it is represented at 4 bits by $\hat{C}^i=0110$ (see FIG. 6).

For each 32 ms sample block, there are thus two values $\hat{C}^i$ by signal subband, representing 16 $\hat{C}^i$ pairs for all p subbands. Each of said pairs is then used to determine the transient or non-transient type of the signal segment represented by the sample block being processed. For this, the increments of $\Delta\hat{C}^i$ are determined as follows:

$$\Delta\hat{C}^i = {}^1\hat{C}^i - {}^2\hat{C}^i \quad \text{for } i=1, 2, \ldots, p \quad (6)$$

While p=16 has been chosen to cover the frequency band (0-4000 Hz) when the speech signal to be coded is to be transmitted in the telephone band (300-3200 Hz), the last three sub-bands can be ignored thus preserving only the sub-bands, for which i=1, 2, 3, ..., 13.

The preserved values $\Delta\hat{C}^i$ are then compared with predetermined thresholds or limiting values, for example +3 and −4 which are binary-coded with three bits. Any sample block is called transient for which one of the values $\Delta\hat{C}^i$ is:

$$\Delta\hat{C}^i > 3 \quad (7)$$

or {

$$\Delta\hat{C}^i < -4 \quad (8)$$

That is, $\Delta\hat{C}^i$ outside the limits defined by the +3 and −4 thresholds.

If one of the conditions (7) or (8) is fulfilled, the two corresponding values $^1\hat{C}^i$ and $^2\hat{C}^i$ are transmitted to multiplexor MPX. Otherwise, only the greater one of the two values $\hat{C}^i$ which is automatically determined because the sign of $\Delta\hat{C}^i$ is already known, is transmitted. Device PAR of FIG. 1 implemented according to the aforementioned U.S. patent and ICASSP article is modified according to FIG. 2 taking into consideration the above expression.

Figure 2:
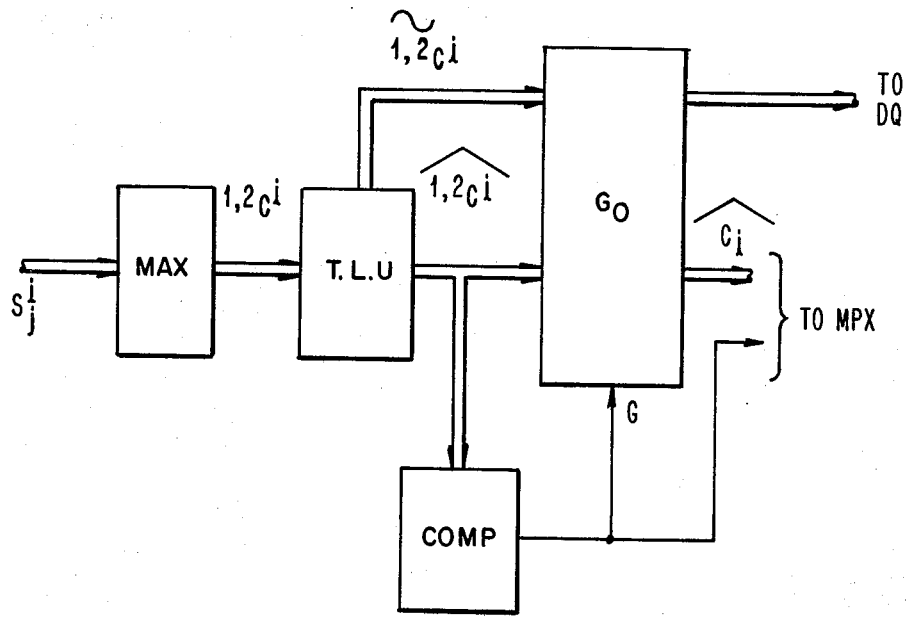
FIG. 2 is a block diagram of an embodiment of one of the elements of FIG. 1.

FIG. 2 includes a maximum generator (MAX) performing the operations (4) and (5). (MAX) can be any sorting device operating in parallel on the different subbands (for example, i=1, 2, ..., 13). For each subband considered, two 12-bit coded values of $C^i$, that is $^1C^i$ and $^2C^i$, can be derived because the values $S_j{}^i$ used to determine $C^i$ are coded with 12 bits. The output of multiplexor MAX is sent to a device T.L.U. which contains either a read only memory or a device containing an algorithm of successive tests method. Device T.L.U. provides on the one hand 4-bit coded $\hat{C}^i$ pairs referred to as $^{1,2}\hat{C}^i$, and on the other hand 12-bit coded $C^i$ pairs referred to as $^{1,2}C^i$. The expressions $^{1,2}\hat{C}^i$ are transmitted to a set of gates Co and to a comparator COMP. Comparator COMP which performs the operations according to (6), (7) and (8) and supplies a 1-bit output G indicating whether the processed sample block is transient or non-transient. This bit G is a so-called MODE bit which activates all gates Go so that for each subband either the two values $^{1,2}\hat{C}^i$ and the two values $^{1,2}C^i$ pass (if the processed sample block is transient) or the greater one of values $^1\hat{C}^i$ and $^2\hat{C}^i$ and the greater one of values $^1\hat{C}^i$ and $^2\hat{C}^i$ pass (if the block is non-transient).

Figure 3:
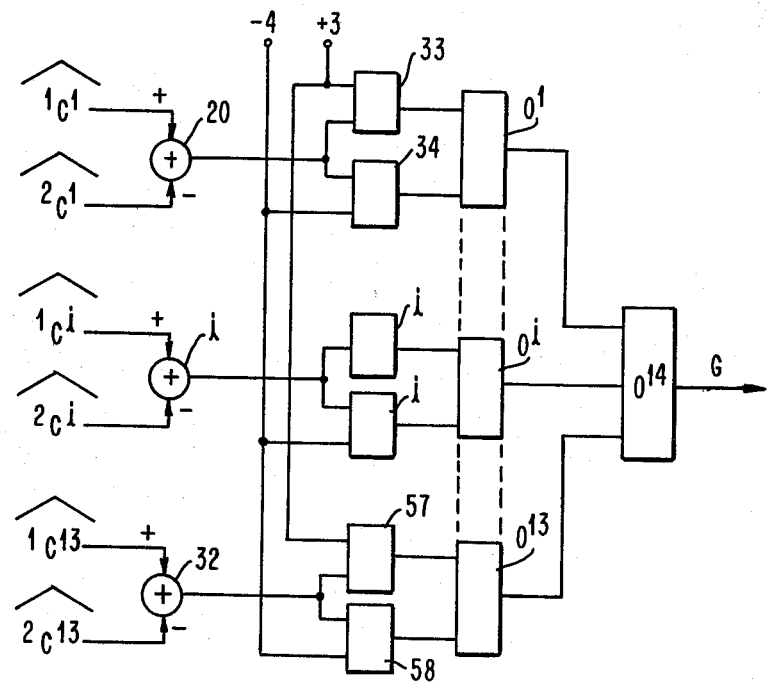
FIG. 3 is a schematic diagram of a circuit used in FIG. 2.

FIG. 3 represents a logic circuit performing the operations of comparator COMP. This circuit comprises subtractors 20 to 32 determining the values $\Delta\hat{C}^i$. A set of comparators 33 to 58 compare the values $\Delta\hat{C}^i$ with the predetermined thresholds (−4 and +3). Then the logic OR circuits referenced from $0^1$ to $0^{14}$ combine the outputs of comparators 33 to 58 to determine if any one of values $\Delta\hat{C}^i$ is greater than 3 or less than −4. If so, the output of $0^{14}$ would indicate this by means of the MODE bit G. This bit G is transmitted to the multiplexor at the same time as the selected scale factors $\hat{C}^i$. The importance of bit G is such that in practice it is useful to protect it by associating it with one or two protection bits. Thus, a so-called 2- or 3-bit MODE character is obtained.

In order to facilitate decoding operations at the other end of the transmission line, the receiver must be able to relocate the blocks within the received bit train. For this, the multiplexor MPX associates a predetermined so-called synchronization character with each sample block. Under these conditions, the message defining a sample block has the following format:

| Samples | $C^i$ | MODE | SYNCHRO |
|---|---|---|---|
| | | | ←time |

Figure 4:
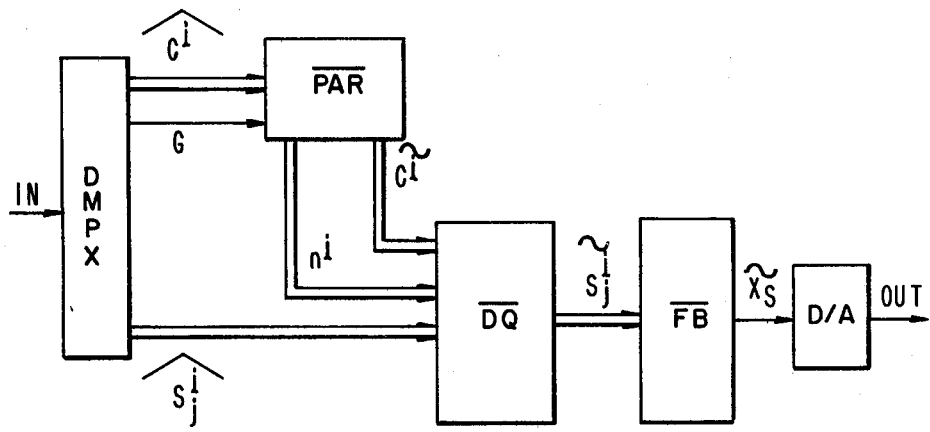

FIG. 4 illustrates a receiver located at the end of the transmission line opposed to that connected to the output of multiplexor MPX. This receiver has the task of restoring the original speech signal. A similar receiver has already been described in the above-mentioned IEEE ICASSP publication. It should be noted that the bit train received at input IN connected to the transmission line is demultiplexed in DMPX. This means that demultiplexor DMPX identifies the data blocks reveived by means of the synchronization character (SYNCHRO) which it retrieves from the message received. It also suppresses in this message the so-called protection bits, and it separates the values $\hat{C}^i$ from the values $\hat{S}_j^i$. Values $\hat{C}^i$ are transmitted to an inverse parameter generator $\overline{PAR}$. Demultiplexor DMPX, with the help of bit G, also recognizes whether it has received a 32 ms block or two 16 ms blocks. In other words, it distinguishes between non-transient and transient blocks and decoding is organized accordingly. The values $\hat{C}^i$ are transmitted to the inverse generator $\overline{PAR}$ and the values $\hat{S}_j^i$ are sent to an inverse requantizer $\overline{DQ}$. The inverse generator $\overline{PAR}$ uses a table such as T.L.U., but inverted, to transcode the four bits into 12 bits. It has been decided to code at an average value all expressions $\hat{C}^i$ within two limits and the transcoding operation thus supplies the estimated values $\bar{C}^i$. (This explains why at the input of DQ, the value $\bar{C}^i$ has been represented instead of $C^i$). Having obtained the values $\bar{C}^i$, generator $\overline{PAR}$ derives therefrom the values $n^i$ using expression (1). By means of the values $n^i$ and $\bar{C}^i$, the inverse requantizer $\overline{DQ}$ determines the values $Q^i$ (expression (2)). These are used to process the values $\hat{S}_j^i$ to derive therefrom the values $\bar{S}_j^i$ which, when supplied to inverse filter bank $\overline{FB}$, allow the samples $X_s$ to be rebuilt. The latter are sent to the digital/analog converter D/A which supplies the reconstructed speech signal.

Figure 5:
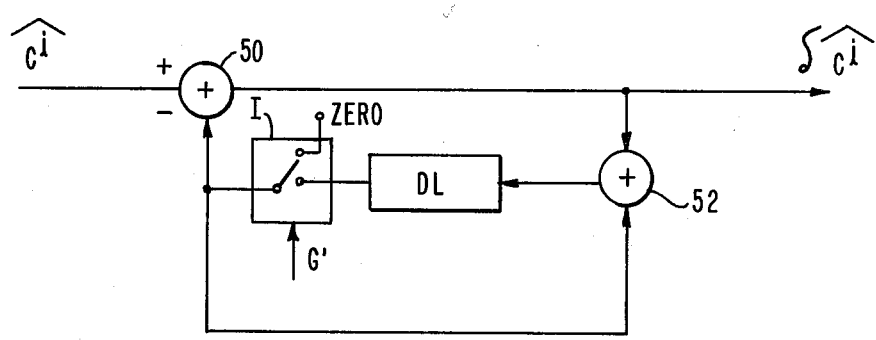
FIG. 5 is a schematic diagram of a circuit constructed according to the invention.

FIG. 5 illustrates a device for further improving the distribution of the coding bits. It is to be noted that bit G distinguishes between non-transient and transient blocks. This bit will be used to control the coding type to be used for the scale factors. When two non-transient blocks follow each other which indicates that the scale factor changes very slowly (and if this variation takes place between two predetermined thresholds, for example +1 and −2), the scale factor $\hat{C}^i$ will be delta-coded thus yielding $\Delta \hat{C}^i$. Other situations can be envisaged; for example, when a non-transient block follows or precedes a transient block, a delta-type coding could also be used for the values $\hat{C}^i$ and $^1\hat{C}^i$ or $^2\hat{C}^i$. By way of example, let's take the case where delta-coding is only used if two non-transient blocks follow each other. If a block is non-transient, the consecutive values $\hat{C}^i$ are sent to the input (+) of a subtractor 50 whose input (−) receives the values $\hat{C}^i$ of the preceding block. These preceding values $\hat{C}^i$ originate from a 32 ms delay line DL. An adder 52 located at the input of delay line DL adds the output of 50 and the DL output. Thus, the output of subtractor 50 provides the variation of the values $\hat{C}^i$ which can be requantized, provided said variation is comprised between −1 and +2. This can be checked by means of a circuit similar to that of FIG. 3, which would supply a control signal G' instead of G. This control should open the line located at the DL output (switch I on zero position).

While the invention has been particularly illustrated in the drawings and described with reference to a preferred embodiment thereof, it will be understood by those skilled in the art that numerous changes in form and detail may be made therein without departing from the spirit and scope of this invention. Those skilled in the art can choose the coding method described here for example for storing speech information instead of transmitting. In such a case, they can delete the so-called synchronization characters added by the multiplexer and use the system without major modifications.

We claim:

1. A method for coding a signal the frequency spectrum of which covers a predetermined and relatively limited band and in which the signal to be coded is sampled so as to supply a continuum of consecutive samples, said samples being divided into successive segments of predetermined time duration, each segment thus containing a block of samples to be coded with a predetermined number of bits, said method comprising the following operations:
   determining from each of said sample blocks a predetermined number of scale factors individually defined in accordance with the BCPCM type methods;
   comparing each with the other said scale factors obtained from a given sample block so as to derive from said comparison a measure of the amplitude variation of the compared scale factors;
   identifying each said sample block as a transient block or as non-transient block depending on whether the amplitude of variation of the scale factor of the said block falls outside or within predetermined limit values;
   determining the number of scale factors to be retained for a said block depending upon its identification;
   determining the number of bits required for coding said scale factor or factors of a said block based upon the number of scale factors to be retained for a said block;
   determining the number of bits remaining available for quantizing the samples of a said block; and
   coding said scale factor or factors and the samples of the block considered.

2. Method for coding a signal, the frequency bandwidth of which is divided into several subbands, the contents of each subband being BCPCM-coded with dynamic distribution of the coding bits available between the different subbands, said method including the following operations:
   determining from each sample block at least two scale factors determined in each subband according to the BCPCM method;
   comparing each with the other the scale factors of each subband so as to derive therefrom an information on the variation of the amplitude of the compared scale factors;

identifying the sample block of all subbands as transient blocks or non-transient blocks depending on whether the amplitude variation for any one of said sub-bands falls outside or inside predetermined threshold values;

determining the number of bits required for coding of said scale factors depending on the number of scale factors retained for the block considered;

determining the number of remaining bits available for quantizing the samples of the block considered, and quantizing the scale factors and the samples of the said block.

3. Coding method according to claim 1 or 2, further characterized in that a unique MODE character is used to identify a said sample block as either a non-transient block or a transient block.

4. A coding method using a predetermined number of bits for coding a signal the initial frequency band of which is divided into p sub-bands containing signal samples initially quantized with a predetermined, relatively high number of bits, which are to be requantized by blocks according to a method for dynamically distributing the requantizing bits depending on the signal energy contained in each of said subbands, said method including the following steps:

determining from each sample block in each subband at least two scale factors $^1C^i$ and $^2C^i$ according to the relations:

$$^1C^i = \max_{j=1 \text{ to } K'/2} (|S_j^i|)$$

and $$^2C^i = \max_{j=(K'/2)+1 \text{ to } K'} (|S_j^i|)$$

where $K'$ is the number of samples by subband and by sample block, $S_j^i$ representing the subband samples, i and j being indexes indicating respectively the rank of the sub-band considered with the p sub-bands, and the rank of the sample in the block considered;

recoding said scale factors $^1C^i$ and $^2C^i$ at a lower bit rate, thus generating $^1\hat{C}^i$ and $^2\hat{C}^i$; determining an increment $\Delta\hat{C}^i$ such that:

$$\Delta\hat{C}^i = {}^1\hat{C}^i - {}^2\hat{C}^i$$

for each sub-band;

comparing each of said increments with a first and a second threshold;

identifying each said sample block for all p subbands as either a transient block or a non-transient block depending on the result of said comparison;

retaining one or the two $\Delta\hat{C}^i$ values for said sub-band for the said block depending on said identification and deriving therefrom the number of bits to be used for coding said $\Delta\hat{C}^i$ value(s);

determining the number of remaining bits available for dynamically requantizing the signal samples $X_j^i$ so that:

$$Q^i = \frac{\tilde{C}^i}{2^{n^i - 1}}$$

and $$n^i = 1/p \left( N - \sum_{j=1}^{p} \log \tilde{C}^i \right) + \log \tilde{C}^i$$

where $Q^i$ is the requantizing step to be used for requantizing the samples of the $i^{th}$ subband, $n^i$ the corresponding bit rate and N the total number of samples bits for all p subbands.

5. A coding method according to claim 4, wherein said recoding of the scale factors $^1C^i$ and $^2C^i$ uses a logarithmic scale.

6. A coding method according to claim 5, wherein said logarithmic scale uses 4-bit coding of the scale factors $^1C^i$ and $^2C^i$ originally coded at 12 bits.

7. A device for multiplex transmission of a speech-like signal covering a given frequency range including:

means for sampling said signal and digitally coding the samples at a relatively high bit rate;

filter means connected to said sampling device;

parameter generator means connected to said filter means for generating values $C^i$ and $n^i$, said parameter generator comprising a table for transcoding the scale factors at a lower bit rate, a comparator for comparing each with the other the scale factors derived from a said sample block and for determining the non-transient or transient character of a said sample block and for deriving therefrom the number of scale factors to be retained for said block;

requantizing means connected to said filter bank and parameter generator; and, multiplexer means connected to said parameter generators and requantizing device for multiplexing the information to be transmitted.

8. A transmission device according to claim 7, wherein said parameter generator further comprises means for generating MODE information (G) transmitted to the multiplexer device said mode information being used to identify the sample block to be transmitted as being a non-transient or a transient block.

* * * * *